United States Patent Office 3,336,146
Patented Aug. 15, 1967

3,336,146
ASPHALTIC EMULSIONS
Leonard Henschel, Flushing, N.Y., assignor to Mobil Oil Corporation, a corporation of New York
No Drawing. Filed Dec. 12, 1963, Ser. No. 329,961
16 Claims. (Cl. 106—277)

This invention relates to asphaltic emulsions, and, more particularly, to asphaltic emulsions useful as mulches in treating soil for the promotion of plant growth. Still more particularly, the invention relates to a method for treating soil, employing compositions comprising asphaltic emulsions which improve the characteristics of soils and promote plant growth.

As is well known to those skilled in the art, the water retention characteristics of soils are of great importance in promoting plant growth and insuring a high degree of productivity. In the past, various materials have been proposed for this purpose, with the object of absorbing moisture, retaining the moisture in a form available to plant life and of such porosity as to permit penetration of surface moisture into the soil. While such materials have been found to be sufficiently effective in soils of areas exposed to average rainfall or to other methods for wetting the surface area thereof, these materials have been found to be markedly ineffective for use in soils of arid areas, in which the soil is not sufficiently porous to permit the passage of moisture thereinto. In such arid areas, even if the soil were first broken up and loosened to make it sufficiently porous to permit the introduction of water or moisture, the substantial evaporation thereof, due to climatic conditions, once more renders the area arid, and plant life is difficult to sustain. Even in arid areas where the soil is sandy, or loose, the inability to retain water or moisture introduced into the soil, by reason of rapid evaporation due to environmental conditions, also results in the inability of the soil to retain an adequate degree of moisture for sustaining plant life.

It is, therefore, an object of the present invention to provide novel and improved compositions for conserving water in the soil of arid areas.

Another object of the invention is to provide a method for treating soil of arid areas employing novel and improved compositions for conserving water therein.

Other objects and advantages inherent in the invention will become apparent to those skilled in the art, from the following detailed description.

In accordance with the present invention, new and improved asphaltic compositions are provided, suitable for use as mulches for conserving water in the soil of arid areas. As more fully hereinafter described, these compositions comprise, in general, aqueous acidic emulsions of petroleum asphalts and hydrophilic clays, prepared in the manner as more fully hereinafter described. By applying a spray or otherwise wetting the surface of the soil of an arid area with the emulsion compositions of the present invention, a continuous film is formed on the surface of the soil, permitting the water in the emulsion to penetrate the soil, without the danger of being otherwise first evaporated, by reason of the passage of air over the soil surface. Thus, apart from the asphaltic film acting as a shield in preventing the drying effect of air currents on the water contained in the emulsion and in permitting such water to penetrate the soil, this film also functions in retaining in the soil whatever moisture is already present, prior to the application of the present emulsion composition.

As previously indicated, the novel compositions of the present invention comprise, in general, an aqueous acidic emulsion of a petroleum asphalt and a hydrophilic clay. The petroleum asphalt may comprise an asphalt obtained by removing the distillate from a naphthenic or mixed-base crude oil; or may comprise a residue obtained from a vacuum-reduced or steam-stripped crude oil; or a blown-asphalt from a solvent tar or asphalt residue.

The hydrophilic clays which are employed in the aqueous acidic emulsion, in combination with the petroleum asphalt, may comprise the naturally occurring chemically unmodified clays. These clays may comprise crystalline complex silicates, the exact composition of which is not subject to precise description, since they vary widely from one natural source to another. These clays may be described as complex inorganic silicates, and include such materials as aluminum silicates, magnesium silicates, barium silicates, and the like, containing, in addition to the silicate lattice, varying amounts of cation, exchangeable groups, generally regarded as metallic oxide radicals. Hydrophilic clays which are particularly useful for the purposes of the novel asphaltic compositions of the present invention include montmorillonite clays, e.g. bentonite, attapulgite, hectorite, illite, saponite, sepiolite, biotite, vermiculite, zeolite clays and the like.

In preparing the novel asphaltic emulsion compositions, in accordance with the general process of the present invention, an aqueous acidic slurry of the hydrophilic clay is first prepared. The quantity of clay present in this slurry is, in general, from about 5 to about 20, and, preferably, from about 10 to about 20 percent, by weight. The acidity of this aqueous slurry is, in general, adjusted to a pH value from about 4 to about 6, and preferably to a pH value from about 4.5 to about 5.5. Various acidifying agents may be employed for this purpose such as, for example, aluminum sulfate, sodium dichromate, sodium acid pyrophosphate, and various acid salts. In order to insure substantially complete hydration of the hydrophilic clay, the aqueous clay slurry, after blending of water, clay and pH adjusting components, is preferably cured upon standing at ambient temperature for a period of time which may vary from several days to about a week or longer.

Following the aforementioned prepartion of the aqueous acid clay slurry, this slurry is preheated to an elevated temperature. Preferably, for this purpose, the slurry is preheated to a temperature within the range from about 150° F. to about 170° F. To the thus preheated slurry is added the petroleum asphalt, which has also been preheated to an elevated temperature, preferably to a temperature within the range from about 250° F. to about 300° F. The slurry and the asphalt are mixed and blended in a high-speed blender for a short period of time, resulting in an aqueous acidic emulsion of the petroleum asphalt and hydrophilic clay. The quantity of asphalt added to the slurry is in such amount as to obtain an aqueous asphaltic emulsion in which the ratio of asphalt to clay is from about 5:1 to about 10:1, by weight. The emulsion thus produced may, if so desired, be further diluted with water for application to the soil surface. Varying pesticides or fertilizers and other soil improving agents may also be added to the emulsion, if so desired.

The thus-produced asphaltic emulsion may be applied to the soil surface as a mulch by spraying or other means of application, forming a protective film over the soil which does not readily wash away. This film serves to retain moisture in the soil, and yet is sufficiently thin to permit seedlings to break through. The film, furthermore, serves to raise the soil temperature for making possible early planting. Eventually, this film, having served its purpose, will disintegrate and can be plowed into the soil.

The following examples will serve to illustrate the preparation of the aforementioned novel and improved asphaltic compositions of the present invention, and to demonstrate their utility and effectiveness as agricultural mulches.

As shown by the examples, different asphaltic emulsion compositions were prepared, following the general method of preparation previously described, and suitably diluted for soil-treating purposes. The characteristics of the asphaltic compositions and the results obtained from the use thereof with respect to the propagation of radish seedlings are also described in the following tables. Table I describes the properties of the petroleum asphalts employed in the finished clay-stabilized asphalt emulsion concentrates of Examples 1 through 4 of Table II. The asphalt of Example 1 was a blown straight-run residual asphalt. The asphalt of Example 2 was a thermal asphalt from the catalytic cracking of aromatic gas oil. The asphalt of Example 3 was a vacuum-reduced straight-run asphalt. The asphalt of Example 4 was a blend of a vacuum-reduced, straight-run asphalt, containing 7 percent, by weight, of a fully refined paraffin wax.

mercially available bentonite was employed as the hydrophilic clay, and aluminum sulfate as an acidifying agent for obtaining the desired pH range. The preparation of the finished emulsion concentrates of each of Examples 1 through 4 in Table II, was carried out in the following manner: a clay-water slurry was first prepared comprising, approximately, by weight, 18 percent bentonite, 0.18 percent aluminum sulfate, and 81.82 percent water. These components were blended and allowed to cure by standing at room temperature for a period of one week. The pH of the respective slurries was adjusted to the range from about 5.0 to about 6.0. The finished emulsion concentrates, as shown in the corresponding Examples 1 through 4 of Table II were prepared by first preheating approximately from about 25 to about 30 percent, by weight, of the required asphalt to a temperature within the range from about 250° F. to about 300° F. About 15 to about 25 percent, by weight, of the required cured clay slurry adjusted with 0.03–0.05 percent aluminum sulfate to a pH of 5.0–6.0 was preheated to a temperature within the range from about 150° F. to about 170° F. and poured into a high-speed blender. The asphalt was then added rapidly to the clay slurry. The remaining 50 to 55 percent, by weight, of the required water was then added, and the mixture was agitated at high-speed for a period of one minute. The respective formulations of the finished clay-stabilized asphalt emulsion concentrates, are shown in the corresponding examples of Table II.

TABLE II.—FORMULA FOR FINISHED CLAY-STABILIZED ASPHALT EMULSION CONCENTRATES

|  | Example 1 | Example 2 | Example 3 | Example 4 |
|---|---|---|---|---|
| Percent by wt.: |  |  |  |  |
| Asphalt | 30.00 | 25.00 | 30.00 | 25.00 |
| Water | 66.97 | 69.95 | 66.97 | 69.95 |
| Bentonite | 3.00 | 5.00 | 3.00 | 5.00 |
| Aluminum Sulfate | 0.03 | 0.05 | 0.03 | 0.05 |

In preparing the finished clay-stablized emulsion concentrates as shown in Examples 1 through 4 of Table II, in addition to the petroleum asphalt components described in the corresponding examples of Table I, above, com- The concentrated clay-stabilized emulsions of the examples of Table II were next diluted with equal amounts of water in a slow-speed mixer, and applied as mulches to experimental soil patches, implanted with radish seedlings. The results obtained are shown in the data of Table III.

TABLE I.—PROPERTIES OF ASPHALTS USED IN ASPHALT EMULSIONS FOR AGRICULTURAL MULCH

|  | Example 1 | Example 2 | Example 3 | Example 4 |
|---|---|---|---|---|
| Sp. Gr. at 77/77° F | 1.041 | 1.164 | 0.9967 | 1.019 |
| Softening Point (R&B), °F | 132 | 111 | 111 | 120 |
| Penetration 77/100/5 | 63 | 69 | 109.5 | 62 |
| Sol. in $CS_2$, percent | 99.79 | 99.7 | 99.92 | 99.75 |
| Flash, COC, °F | 525 | 455 | 610 | 470 |
| Vis. at: |  |  |  |  |
| 250° F., SFS | 911 | 31 | 303 | 192 |
| 300° F | 202 | 9 | 85 | 59 |

TABLE III.—CLAY STABILIZED EMULSIONS

|  | Example 1 | Example 2 | Example 3 | Example 4 |
|---|---|---|---|---|
| Asphalt Content, Wt., percent | 15.0 | 12.5 | 15.0 | 12.5. |
| Overall Rating | Excellent | Good | Very Good | Poor. |
| Application Characteristics: |  |  |  |  |
| 1 Sprayability | do | Excellent | Good | Good. |
| 2 Soil Wetting | do | do | Excellent | Excellent. |
| 3 Spreading of Film | Rapid | Rapid | Rapid | Rapid. |
| 4 Drying Speed, Min | 15 | 15 | 20 | 20. |
| Film Characteristics: |  |  |  |  |
| After 2 hrs | Black-Dry Continuous Film. | Black-Dry Continuous Film. | Black-Dry Continuous Film. | Black-Dry Continuous Film. |
| 1 Resistance to Rain | Good | Good | Good | Good. |
| 2 Heat Absorption at Noon, Sun Side | do | do | do | Do. |
| Biological Effects: |  |  |  |  |
| 1 Time of emergence, Days | 3 | 3 | 3 | 3. |
| 2 Germination, percent | 100 | 100 | 90 | 90. |
| 3 Condition of Seedlings | Healthy | Healthy | Healthy | Healthy. |
| 4 Subsequent Growth | Advanced | Normal | Normal | Retarded. |
| Storage Stability of emulsion after 6 months | Excellent | Good | Good | Fair. |

The improved results obtained with the asphaltic emulsions of the present invention will be apparent from the foregoing data. It will be understood, of course, that other petroleum asphalts, hydrophilic clays and pH adjusting agents may be readily substituted for those shown in the foregoing examples, and that other beneficiating materials may also be added to these asphaltic emulsions, if so desired, as those skilled in the art will readily appreciate. In addition, while preferred embodiments of the novel asphaltic emulsion compositions of the present invention and the method for their preparation, have been described for purposes of illustration, it will be understood that various modifications and adaptations thereof, which will be obvious to those skilled in the art, may also be made without departing from the spirit of the invention.

I claim:

1. A method for preparing an asphaltic emulsion which comprises: preparing an aqueous acidic slurry of a hydrophilic clay; preheating said slurry to an elevated temperature; preheating a petroleum asphalt to an elevated temperature; and admixing said slurry with said asphalt in such amounts as to obtain an aqueous asphaltic emulsion.

2. A method for preparing an asphaltic emulsion which comprises: preparing an aqueous acidic slurry of a hydrophilic clay; preheating said slurry to an elevated temperature; preheating a petroleum asphalt to an elevated temperature; and admixing said slurry with said asphalt in such amounts as to obtain an aqueous asphaltic emulsion wherein the ratio of asphalt to clay is from about 5:1 to about 10:1, by weight.

3. A method for preparing an asphaltic emulsion which comprises: preparing an aqueous acidic slurry of a hydrophilic clay, said clay being present in an amount from about 5 to about 20 percent, by weight; preheating said slurry to an elevated temperature; preheating a petroleum asphalt to an elevated temperature; and admixing said slurry with said asphalt in such amounts as to obtain an aqueous asphaltic emulsion wherein the ratio of asphalt to clay is from about 5:1 to about 10:1, by weight.

4. A method for preparing an asphaltic emulsion which comprises: preparing an aqueous acidic slurry of a hydrophilic clay, said clay being present in an amount from about 10 to about 20 percent, by weight; preheating said slurry to an elevated temperature; preheating a petroleum asphalt to an elevated temperature; and admixing said slurry with said asphalt in such amounts as to obtain an aqueous asphaltic emulsion wherein the ratio of asphalt to clay is from about 5:1 to about 10:1, by weight.

5. A method for preparing an asphaltic emulsion which comprises: preparing an aqueous acidic slurry of a hydrophilic clay having a pH value from about 4 to about 6, said clay being present in an amount from about 5 to about 20 percent, by weight; preheating said slurry to a temperature within the range from about 150° F. to about 170° F.; preheating a petroleum asphalt to a temperature within the range from about 250° F. to about 300° F.; and admixing said slurry with said asphalt, in such amounts as to obtain an aqueous asphaltic emulsion wherein the ratio of asphalt to clay is from about 5:1 to about 10:1, by weight.

6. A method for preparing an asphaltic emulsion which comprises: preparing an aqueous acidic slurry of a hydrophilic clay, having a pH value from about 4.5 to about 5.5, said clay being present in an amount from about 10 to about 20 percent, by weight; preheating said slurry to a temperature within the range from about 150° F. to about 170° F.; preheating a petroleum asphalt to a temperature within the range from about 250° F. to about 300° F.; and admixing said slurry with said asphalt, in such amounts as to obtain an aqueous asphaltic emulsion wherein the ratio of asphalt to clay is from about 5:1 to about 10:1, by weight.

7. A method for treating soil which comprises applying to the soil surface a composition comprising an aqueous acidic emulsion of a petroleum asphalt and a hydrophilic clay to form a continuous film of said composition on the soil surface.

8. A method for treating soil which comprises applying to the soil surface a composition comprising an aqueous acidic emulsion of a petroleum asphalt and a hydrophilic clay, said emulsion having a pH value in the range from about 4 to about 6, to form a continuous film of said composition on the soil surface.

9. A method for treating soil which comprises applying to the soil surface a composition comprising an aqueous acidic emulsion of a petroleum asphalt and a hydrophilic clay, said emulsion having a pH value in the range from about 4.5 to about 5.5, to form a continuous film of said composition on the soil surface.

10. A method for treating soil which comprises applying to the soil surface a composition comprising an aqueous acidic emulsion of a petroleum asphalt and an aqueous slurry containing from about 5 to about 20 percent, by weight, of a hydrophilic clay, said asphalt being present in such amount wherein the ratio of asphalt to clay is from about 5:1 to about 10:1, by weight, to form a continuous film of said composition on the soil surface.

11. A method for treating soil which comprises applying to the soil surface a composition comprising an aqueous acidic emulsion of a petroleum asphalt and an aqueous slurry containing from about 5 to about 20 percent, by weight, of a hydrophilic clay, said asphalt being present in such amount wherein the ratio of asphalt to clay is from about 5:1 to about 10:1, by weight, and said emulsion has a pH value in the range from about 4 to about 6, to form a continuous film of said composition on the soil surface.

12. A method for treating soil which comprises applying to the soil surface a composition comprising an aqueous acidic emulsion of a petroleum asphalt and an aqueous slurry containing from about 10 to about 20 percent, by weight, of a hydrophilic clay, said asphalt being present in such amount wherein the ratio of asphalt to clay is from about 5:1 to about 10:1, by weight, and said emulsion has a pH value in the range from about 4 to about 6, to form a continuous film of said composition on the soil surface.

13. A method for treating soil which comprises applying to the soil surface a composition comprising an aqueous acidic emulsion of a petroleum asphalt and an aqueous slurry containing from about 10 to about 20 percent, by weight, of a hydrophilic clay, said asphalt being present in such amount wherein the ratio of asphalt to clay is from about 5:1 to about 10:1, by weight, and said emulsion has a pH value in the range from about 4.5 to about 5.5, to form a continuous film of said composition on the soil surface.

14. A composition having a pH from about 4 to about 6, comprising: water; from about 5 to about 20 percent, by weight, of a hydrophilic clay, based on the weight of the clay and water; and petroleum asphalt, the ratio of asphalt to clay being from about 5:1 to about 10:1, by weight.

15. A composition as defined in claim 14 having a pH from about 4.5 to about 5.5.

16. A composition as defined in claim 14 wherein said hydrophilic clay is present in an amount from about 10 to about 20 percent, by weight, based on the weight of the clay and water.

References Cited

UNITED STATES PATENTS

| | | | |
|---|---|---|---|
| 2,327,882 | 8/1943 | Gabriel et al. | 106—277 |
| 2,927,402 | 3/1960 | Goren et al. | |
| 3,155,528 | 11/1964 | Cubberley et al. | 106—283 XR |

FOREIGN PATENTS

| | | |
|---|---|---|
| 590,122 | 1/1960 | Canada. |
| 462,566 | 3/1937 | Great Britain. |

ALEXANDER H. BRODMERKEL, *Primary Examiner.*

SAMUEL H. BLECH, *Examiner.*

J. B. EVANS, *Assistant Examiner.*